Nov. 14, 1961  L. BOURDALÉ ET AL  3,008,543
FILTERING CENTRIFUGAL SEPARATORS
Filed April 13, 1959  2 Sheets-Sheet 2
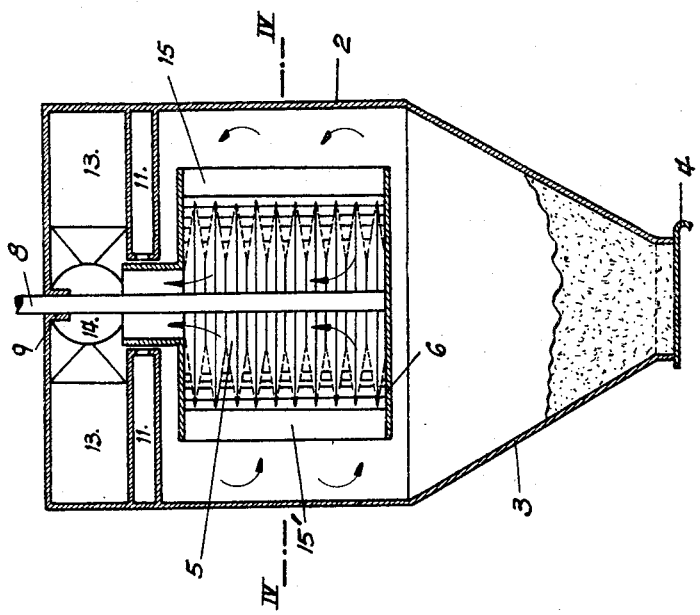
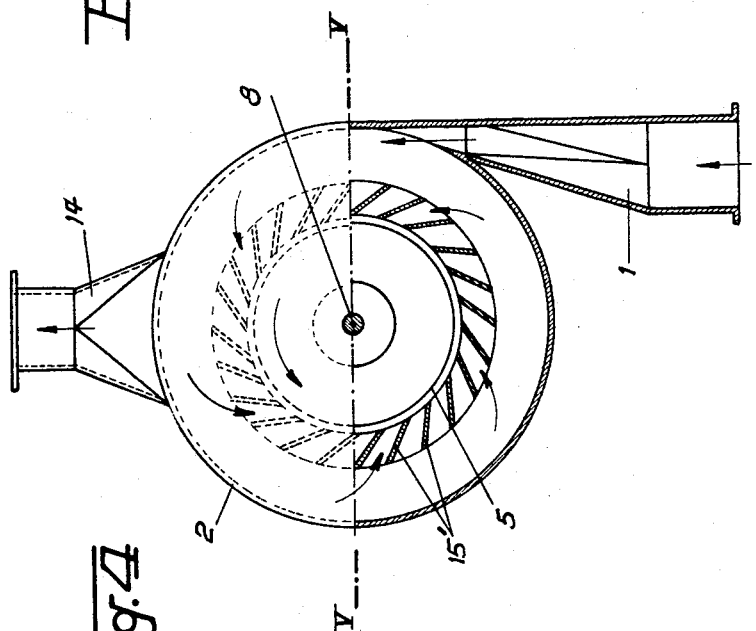

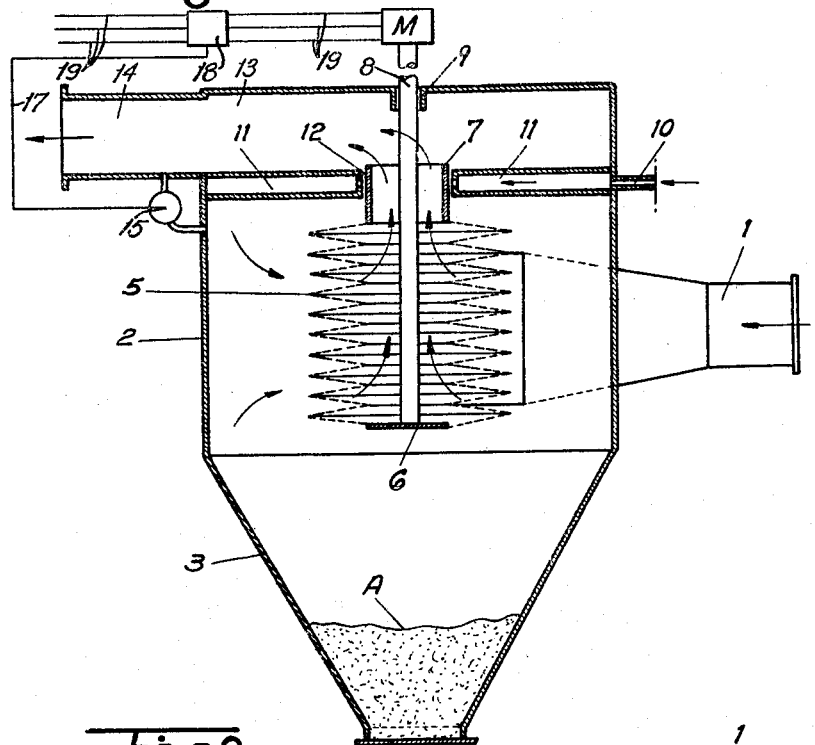
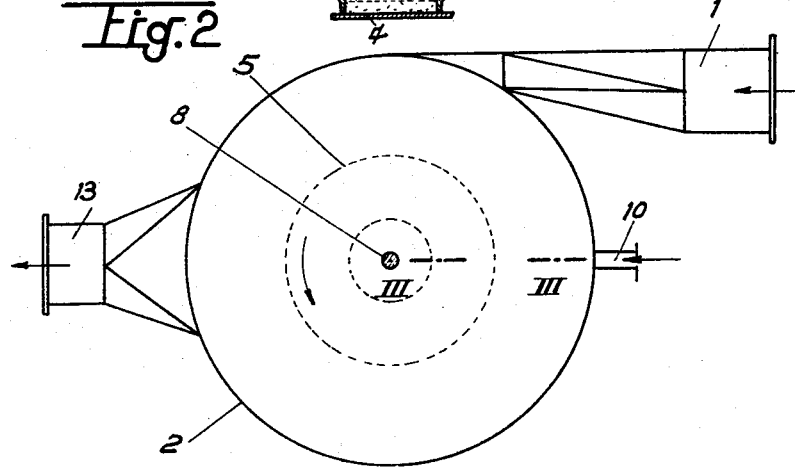
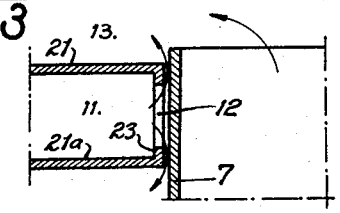

3,008,543
FILTERING CENTRIFUGAL SEPARATORS
Lucien Bourdale, 33 Blvd. de Valmy, Colombes (Seine), France, and Marc Chatellard, Cite Jolimont A.I. 8, Toulouse (Haute-Garonne), France
Filed Apr. 13, 1959, Ser. No. 806,127
Claims priority, application France Apr. 15, 1958
4 Claims. (Cl. 183—63)

The invention relates to improvements in and relating to apparatus for collecting matter suspended in a gaseous fluid. This invention relates more particularly to filtering centrifugal separators for removing suspended matter having a wide range of particle size from a gaseous fluid carrier.

Apparatus for the removal of suspended matter from gaseous fluids are known and such apparatus have respectively used the gravity separation, inertia separation, and the filtration processes. However, in known apparatus the nature and the size of the particles present in the gaseous fluid together with the cost of recovery of the suspended matter determine the individual process used to separate the particles.

It is an object of the present invention to provide an apparatus wherein the removal of the matter suspended in a gaseous fluid carrier is effected by a combination of the filtering gravity and inertia separation processes in order that matter having a greater range of particle size can be removed from the gaseous carrier fluid in a single apparatus and that the matter can be more completely removed from the gaseous carrier fluid.

It is another object of the present invention to provide an apparatus wherein the removal of matter suspended in a gaseous fluid is effected by an apparatus including means combining the filtering gravity and inertia separation processes, said apparatus including a rotatable bladed filter protecting means for deflecting a portion of the smaller sized particles in the suspended matter and reducing the velocity of the remainder of the smaller sized particles to reduce build up of the particles at the filtering means of the apparatus and simultaneously facilitate and provide for removal of said built up particles from said filtering means of the apparatus.

It is a further object of the present invention to provide apparatus of the type described combining the filtering gravity and inertia separation processes wherein the rate of increase of pressure drop through the filtering means of the apparatus resulting from build up of suspended matter over said filtering means is considerably reduced to thereby improve the operating efficiency of the apparatus and reduce operational costs.

Removal of the suspended matter may further be facilitated by further providing the filtering centrifugal separator above described with an electrostatic precipitator operating in conjunction with the means combining the other described processes.

The embodiments illustrated in the accompanying drawings will be described by way of example and without limiting the scope of the invention in order to illustrate the potentialities of the invention.

In the drawings:

FIGURE 1 is a section of an embodiment of the filtering centrifugal separators constructed in accordance with the invention taken along the line I—I of FIG. 2.

FIGURE 2 is a plan view of the filtering centrifugal separator shown in FIG. 1.

FIGURE 3 is a fragmentary enlarged section view taken along the line III—III in FIG. 2.

FIGURE 4 is a half section of another embodiment of the filtering centrifugal separator constructed in accordance with the invention. The sectional view is taken along the line IV—IV of FIG. 5.

FIGURE 5 is a section view taken along the line V—V of FIG. 4.

Now referring to the embodiment illustrated in FIGURES 1 to 3, the filtering centrifugal separator consists of a separator housing having a tangentially directed inlet conduit 1 connected to a fan, pump, compressor or the like for delivering the gaseous fluid carrying the suspended matter into the centrifugal chamber 2 of the separator housing. The separator housing is also formed with a hopper chamber 3 for accumulating the collected material. The hopper chamber 3 extends directly below the centrifugal chamber 2 and the hopper chamber 3 is closed at the bottom thereof by a removable discharge door 4, well known.

The filtering centrifugal separator further includes an exhaust or discharge chamber 13 and an annular chamber 11 separated from the discharge chamber 13 and the centrifugal chamber 2 by inwardly directed walls 21, 21a formed in the separator housing and by a tubular wall 23 joining the inner ends of walls 21, 21a. The hood 14 communicates with the discharge chamber 13 to provide for removal of the purified gaseous fluid from the discharge chamber 13. A gaseous blast of any suitable gas or even of previously purified gaseous fluid carrier derived from a fan, pump, compressor or the like is fed to chamber 11 through tube 10 under pressure which is greater than the pressures in chambers 2 and 13 in order that the separator be operative in the manner described below. The gaseous blast is discharged as a stream under pressure from annular chamber 11 through the slits or small apertures 12. The stream is projected against the outer surface of the tubular sleeve 7 which is concentric with the tubular wall 23 having the apertures 12 and the stream is divided into two oppositely directed annular streams since pressure of the stream is greater than the pressure existing in either chamber 2 or chamber 13. One of the annular streams is directed toward the centrifugal chamber 2 while the other annular stream is directed toward the discharge chamber 13. The pressure of the streams, as described below, is sufficient to define a gaseous curtain in the gap between tubular sleeve 7 and the tubular wall 23 having the apertures 12 to prevent flow of the gaseous fluid carrying the suspended matter through said gap and permit discharge flow of the gaseous fluid through the filter solely past the interior of the tubular sleeve 7 into discharge chamber 13. Hence the stream through apertures 12 is continuous and simultaneous with separation of the suspended matter in the gaseous fluid carrier.

The device 15 which is a pressure differential sensing device, well known, is provided for measuring the amount of pressure drop between the centrifugal chamber 2 and the discharge chamber 13 in the hood 14. The device is operatively connected by an electrical line 17 to a relay 18 in the electrical feed lines 19 of the motor M. The motor M periodically drives the filter 5 through shaft 8 in dependence upon energization or deenergization of the relay 18. The relay 18 is energized when the amount of pressure drop exceeds a predetermined value. The device 15 and the manner in which it controls the relay 18 are well known.

The filtering centrifugal separator further includes a rotatable filter bag 5 comprising a plurality of stacked discs, annular or otherwise, of porous material such as cloth, woven glass cloth, metal cloth and the like defining a filtering envelope. The filter 5 is suspended from a shaft 8 and extends between a support plate 6 and the tubular sleeve 7 which are also both carried by the shaft 8. The shaft 8 passes through the aperture 9 in the separator housing so that the shaft is coaxial with the axis of the separator housing. The space between the shaft 8 and the aperture 9 is sealed in well known and obvious manner forming no part of the present invention.

The filter 5 may be provided with a corrugated pleated outer surface to thereby provide a large filtering surface so that a greater filtering area is provided for a given volume of gaseous fluid fed to the separator. The greater filtering area is operative in cooperation with rotation of the filter 5 to decrease a rate of pressure drop resulting from build up of the separated matter on the filter's outer surface for any given volume of gaseous fluid flow. The pleats, corrugations, or irregular outer surfaces of the filter are so constructed that they cannot collect the particles of matter separated from the carrier fluid by centrifugal separation in the centrifugal chamber 2. The gaseous carrier fluid is discharged from the centrifugal chamber 2 after traversing the filter 5 following the direction indicated by the arrows in FIGURES 1 and 2 within tubular sleeve 7.

The operation of the filtering centrifugal separator is as follows:

Gaseous fluid carrying the suspended matter enters through tangential inlet conduit 1 into the centrifugal chamber 2. The suspended matter is collected in the hopper 3 by gravity and as follows:

(1) The larger of the particles in the suspended matter settle directly in the hopper. In other words these particles fall by gravity directly into the hopper.

(2) Some of the particles smaller than the above described larger particles are inertia separated and collected into the hopper after hurtling against the wall of the centrifugal chamber. In other words these particles are indirectly deposited into the hopper.

(3) The smaller of the particles in the suspended matter are agglomerated in front of or on the filter 5. The accumulated mass of smaller particles then either settle in the hopper 3 by gravity or they are dislodged from the filter 5 by centrifugal action upon periodic or continuous rotation of the filter 5 in response to the measurements by the device 15 which operate the relay 18 to rotate the filter 5.

Now referring to the embodiment shown in FIGURES 4 and 5, this embodiment is analogous to the embodiment shown in FIGURES 1-3 except that, whereas the filter 5 in the embodiment shown in FIGURES 1-3 is periodically rotated, the filter in the embodiment shown in FIGURES 4 and 5 is continuously rotated; also, the device 15 and its function is omitted in the embodiments shown in FIGURES 4 and 5 and a bladed filter protecting means 15' of hardened metal is positioned around the filter 5. The bladed filter protecting means 15' consists of a series of blades interposed between the tubular sleeve and the support plate 6' see FIGURE 5.

In the embodiment shown in FIGURES 4 and 5 the smaller particles accumulated on the filter are continuously dislodged so that the rate of increase of pressure drop through the filter is substantially constant or at least increases very slowly. The bladed filter protector means 15' which rotates with the filter 5 operates to deflect and spread a portion of the smaller particles which would otherwise strike the filter 5 while the remainder of the smaller particles which traverse between the blades, have a low relative velocity with respect to the velocity of the rotating filter 5. The blades on the filter protecting means are so located that they allow matter accumulated on the filter 5 to drop back into the hopper 3 as the mass of the accumulated matter increases sufficiently that centrifugal action resulting from rotation of filter 5 becomes operative to throw off the mass of matter accumulated on the filter 5.

In conclusion, the filtering centrifugal separator according to the invention includes a stationary separator housing divided into a centrifugal chamber and an annular chamber concentric with said centrifugal chamber, said annular chamber extending between the centrifugal chamber and another gaseous fluid discharge chamber, said centrifugal chamber communicating with a hopper chamber for collecting matter suspended in the gaseous fluid and separated therefrom in said centrifugal chamber, said annular chamber communicating both with said centrifugal chamber and with said discharge chamber for discharging a gaseous blast either of filtered gaseous fluid or of any other suitable gaseous fluid at higher pressure than the pressure of the gaseous fluid carrier into said centrifugal chamber and in said discharge chamber, and a filter concentrically mounted for rotary movement within said centrifugal chamber, said filter extending within said centrifugal chamber and defining a porous wall between said centrifugal chamber and said discharge chamber for separating matter suspended in said gaseous fluid and providing the sole passage for purified gaseous fluid between said centrifugal chamber and said discharge chamber.

During continuous rotation of the filter, the matter accumulated on the filter is continuously discharged. It is within the scope of the invention to provide metal screen or baffles upstream from the filter in order to reduce wear of the filter. The metal screens or baffles are operative to further reduce the velocity of the suspended matter relative to the velocity of the filter before the said suspended matter impinges upon the filter.

During periodic rotation of the filter, obtained manually or controlled by a time relay or again automatically controlled by an instrument measuring the pressure drop through the filter, such as device 15, the wear of the filter is nevertheless reduced and saving is effected in the power required to rotate the filter.

Having thus described the invention what is claimed is:

1. A filtering centrifugal separator for gaseous fluid which is forced tangentially thereinto under pressure and which carries suspended matter, said separator having a stationary housing, said housing having inwardly directed walls and with a tubular wall joining the inner ends of said inwardly directed walls to provide an annular chamber within the housing and form a restricted opening in said housing so that the latter is divided into a centrifugal chamber on one side of said restricted opening and a discharge chamber on the other side of said restricted opening, all of said chambers being concentric and said centrifugal chamber communicating with said discharge chamber through said restricted opening, a gaseous blast supply to said annular chamber and apertures in said tubular wall for discharging a stream under pressure from said annular chamber into said restricted opening, the pressure of said stream being greater than the pressures in said centrifugal chamber and in said discharge chamber, said housing having a collecting chamber for receiving separated matter which extends under said centrifugal chamber, a rotatable porous pleated and corrugated filter which is concentrically mounted within said centrifugal chamber, a tangential conduit for delivering said gaseous fluid carrying suspended matter directly into said centrifugal chamber and opposite said filter, a tubular sleeve mounted at one end of said filter and extending through said restricted opening, said sleeve defining a central conduit for gaseous fluid which has passed through said filter and flows into said discharge chamber in the direction opposite the direction of movement of said separated matter, said sleeve extending facing said apertures so that said stream discharged from said annular chamber under pressure is divided as a result of the pressure thereof into a stream flowing toward said discharge chamber in the same direction as the gaseous fluid flowing thereinto and another stream flowing into said centrifugal chamber toward said filter upstream from said tangential conduit which mixes with the flow of gaseous fluid carrying suspended matter, said divided stream defining a gaseous curtain extending around said tubular sleeve and between said centrifugal chamber and said discharge chamber to segregate suspended matter so that it remains in said centrifugal chamber and said collecting chamber, and means adapted to rotate at high speed said filter and said tubular sleeve.

2. A filtering centrifugal separator as claimed in claim 1, further including means responsive to the amount of pressure drop through said filter to periodically operate said means for rotating said filter when said pressure drop reaches a predetermined maximum, whereby matter accumulated on said filter is periodically dislodged by centrifugal action.

3. A filtering centrifugal separator as claimed in claim 1, further including filter protecting means disposed around said filter to reduce wear on said filter and deflect a portion of the suspended matter in said gaseous carrying fluid away from said filter.

4. A filtering centrifugal separator as claimed in claim 3, wherein said protecting means includes a plurality of blades disposed around the circumference of said filter.

References Cited in the file of this patent

UNITED STATES PATENTS

| | | |
|---|---|---|
| 2,244,165 | McFarland et al. | June 3, 1941 |
| 2,269,412 | Sturtevant | Jan. 6, 1942 |
| 2,709,500 | Carter | May 31, 1955 |
| 2,718,933 | Norbom | Sept. 27, 1955 |

FOREIGN PATENTS

| | | |
|---|---|---|
| 148,799 | Great Britain | Oct. 10, 1921 |
| 247,958 | Switzerland | Jan. 3, 1948 |